United States Patent [19]

Tarver et al.

[11] 4,116,708

[45] Sep. 26, 1978

[54] ASPHALT COATING COMPOSITIONS

[75] Inventors: Gilbert W. Tarver; Russell E. Koons, both of El Dorado, Ark.

[73] Assignee: Lion Oil Company, Los Angeles, Calif.

[21] Appl. No.: 610,456

[22] Filed: Sep. 4, 1975

[51] Int. Cl.² .......................... C08K 3/26; C08K 3/36; C08K 3/40; C08L 95/00
[52] U.S. Cl. ..................... 106/281 R; 106/273 R; 106/316; 427/202; 428/468
[58] Field of Search ............. 106/281 R, 273 R, 316; 428/468; 427/202

[56] References Cited

U.S. PATENT DOCUMENTS 3,574,652   4/1971   Alexander et al. ............. 106/281 R

FOREIGN PATENT DOCUMENTS 633,412  12/1963  Belgium .............................. 106/281 R
654,270  12/1962  Canada ............................... 106/281 R

*Primary Examiner*—Allan Lieberman
*Attorney, Agent, or Firm*—Poms, Smith, Lande & Glenny

[57] ABSTRACT

Disclosed are: (1) A primer coating composition containing an air-blown, solvent extracted asphalt having a penetration of about 1 to about 12 and a softening point of about 150° to about 270° F; (2) a blend of 70–92 parts by weight of an air-blown, solvent extracted asphalt having a penetration of about 0 to about 7, and a softening point of about 200° to about 250° F., and about 8 to about 30 parts by weight of a non-air-blown, solvent extracted asphalt having a penetration of about 40 to about 150, and a softening point of about 105° to about 130° F., the blend having a ductility at 77° F., using a speed of one cm per minute of at least 2.5, a penetration of about 7 to about 15, and a softening point of about 200° to about 220° F.; (3) metallic substrates coated with the primer composition set forth above; and (4) metallic substrates having a coating containing the blend set forth above.

4 Claims, No Drawings

ASPHALT COATING COMPOSITIONS

What is claimed is: to improved coating compositions, and is particularly concerned with improved asphaltic primer coatings and bituminous finish coatings for metallic surfaces that resist disbonding under repeated, severe stresses.

To improve bonding of finish coatings to metallic surfaces, it is customary to use a compatible primer between the finish coating and the metallic surface. The primer must not only adhere well to the metallic surface, but must also be compatible with the finish coating. A primary object of this invention is to provide an asphaltic primer composition which, where used with a bituminous finish coating, is easily applied to metallic surfaces, yet resists disbonding under repeated severe stresses. Another primary object is to provide a finish coating binder which, when included in a bituminous finish coating composition, adheres well to this new asphaltic primer, resists disbonding under repeated severe stresses, and is easily applied to a primed metallic surface.

This invention provides an improved primer composition for application to metallic substrates such as pipe. The primer forms a coating layer that adheres tightly when applied to such substrates. The primer comprises an air-blown, solvent extracted asphalt having a penetration of about 1 to about 12, preferably about 3 to about 8, and a softening point of about 150° to about 270° F., preferably about 180° to about 270° F, and a solvent for the asphalt. Through out this specification and claims, penetration means the property measured by ASTM D 5-73 at 77° F (100 g., 5 sec.) in mm/10; Ring and Ball softening point (softening point) means the property measured by ASTM D 36-70 at 77° F.; ductility means the property measured by ASTM D 113-69 at 77° F., and using for these hard asphalts a speed of 1.0 cm per minute. The solvent may be a hydrocarbon such as benzene, toluene, petroleum naphtha, coal tar naphtha, xylene, and the like. Preferred hydrocarbon solvents boil in the range 200°–450° F. at standard temperature and pressure (STP). The proportion of solvent to asphalt is not critical and ranges from fluid to rather viscous compositions.

In practice, primer compositions of this invention may contain about 40% to about 60% by weight of the asphalt, and, correspondingly, about 60% to about 40% by weight of solvent. Preferably, such compositions contain about 45% to about 55% by weight of asphalt, and, correspondingly, about 55% to about 45% by weight of solvent.

The primer may be prepared by heating the asphalt to a molten, fluid stage, and then slowly adding the solvent, with agitation. Usually this is done below the boiling range of the solvent. In some cases it may be desired to place a measured amount of solvent in a tank, and to circulate the solvent from the bottom to the top of the tank. The asphalt is then pumped into the circulating line so that it mixes with about an equal quantity of solvent, or solution, before it empties into the tank. The circulation is continued until all of the asphalt has been added, and solution formed.

Bituminous finish coating compositions useful for protecting metal substrates that are subjected to repeated severe stresses should have high ductility. Such compositions typically contain a minor amount of asphaltic binder with a ductility of at least about 2.5 cm and a major amount of inert mineral filler. This invention provides a new, highly ductile binder comprising a blend of about 70 to about 92 parts by weight of an air-blown, solvent extracted asphalt having a penetration of about zero to about 7, and a softening point of about 200° to about 250° F. and, correspondingly, about 8 to about 30 parts by weight of a non-air-blown, solvent extracted asphalt having a penetration of about 40 to about 150 and a softening point of about 105° to about 130° F. This blend has a penetration of about 7 to about 15, a softening point of about 200° to about 220° F.; and a ductility of at least about 2.5 cm.

The blend may be prepared by adding to the molten blown asphalt, at 375°–450° F., the molten unblown asphalt at 250°–400° F. while mechanically mixing them. The method of mixing is not critical. This method works better than adding the blown asphalt to the unblown asphalt.

Generally, the inert mineral filler comprises an aggregation of two or more different kinds of filler. Especially useful in finish coatings that will be subjected to repeated severe stresses are aggregations comprising about 50 to about 80, preferably about 60 to about 70, parts by weight of sand, about 12 to about 34, preferably about 18 to about 27, parts by weight limestone, and about 0.01 to about 3.0, parts by weight of fibrous inorganic filler, such as asbestos or fiber glass. The preferred range for fibers of about one-half inch in length is 0.1 to 0.2 parts and for fibers of about three thirty-seconds of an inch in length, the preferred range is 0.5 to 1.5 parts.

The sand may be characterized by screen analysis ranges.

| U.S. Standard Sieve Size | Limits of Passing % by weight |
| --- | --- |
| No. 6 mesh | 100 |
| No. 8 | 64–95 |
| No. 16 | 31–53 |
| No. 30 | 12–23 |
| No. 50 | 5–13 |
| No. 100 | 0 |

Preferably, the sand is a loose granular material that results from natural disintegration of rock, rather than from crushed rock.

Preferably, the limestone filler is a commercial grade of crushed stone, principally calcium carbonate, which conforms to the following sieve analysis:

| U.S. Standard Sieve Size | Limits of Passing, % by weight |
| --- | --- |
| No. 50 mesh | 100 |
| No. 200 mesh | 75 |

The sand and limestone mixture is preferably added in proportions sufficient to produce the optimum continuous grading in particle size from coarse to fine, thus minimizing void space.

Fibrous materials are classified by different systems, and are difficult to characterize. Asbestos, if classified by the Canadian system, is preferably added as fibers in Groups 2 through 6, but in general should have an average length of one-eighth to one-half inch. The glass fibers are preferably of approximately the same length and preferably about one-fourth inch in length. They should have a nominal diameter of 0.0001 to 0.001 inch.

The bituminous finish coating generally contains about 80 to about 95, preferably about 86 to about 93, parts by weight inert mineral filler, and about 5 to about 20, preferably about 7 to about 14, parts by weight solvent extracted asphalt of high ductility, preferably at least about 2.5 cm.

The finish coating may be prepared from the molten asphalt at about 350°–400° F. and the dried and heated fillers by proportioning the ingredients and mixing in a pug mill. When uniform, the mixture is delivered through a heated screw conveyor to a coating machine. As the previously primed pipe moves continuously through the coating machine, the desired thickness of coating is extruded onto the pipe.

To achieve the desired physical properties and performance characteristics of the protective coatings of this invention, it is necessary to make the primer coatings and finish coatings from a solvent extracted asphalt. Solvent extracted asphalt is prepared by mixing an asphaltic flux or penetration grade asphalt with propane or a propane-$C_4$ and/or propane-$C_5$ hydrocarbon mixture and allowing the ingredients to separate into two layers. The solvent extracted asphalt is recovered from the bottom layer. Particularly useful solvent extracted asphalts are those prepared from a residuum of South Arkansas crude oil, although other crude oils may be used.

The air-blown solvent extracted asphalts used in the primers and finish coating binders of this invention are non-catalytically air-blown at temperatures in the range about 430° to about 550° F. Non-catalytic air-blowing produces an asphalt that is low in hygroscopicity.

Solvent deasphalting is essentially a liquid-liquid extraction process which is used to separate paraffinic materials from aromatic and asphaltic materials in the reduced crude oils. This process is especially well suited for crude oils which are difficult to reduce by steam and vacuum distillation. The solvent-to-charge ratios may vary considerably, but usually vary from a low of 2:1 to a high of 6:1. The minimum operable solvent-to-charge ratio is highest for high paraffinic base crude residues, and lowest for low paraffinic base crude residues. Solvent extraction takes place in an extractor tower which serves as an intimate countercurrent flow contactor for the solvent and residual oil charge. The deasphalted oil-solvent mixture flows from the top of the extractor tower, and the asphalt which is insoluble in the solvent is withdrawn from the bottom of the tower. Usually, the asphalt recovered from the bottom of the tower passes through an asphalt stripper which is a vertical column equipped with perforated baffle plates wherein steam is used for stripping the remaining solvent and oil from the asphalt.

The residual oil charge for solvent deasphalting comes from the flux oil fraction provided by the fractionation of crude oils. Best results are achieved where the salt content of the asphalt is maintained at less than 20 grams per barrel.

The primer coating composition of this invention is particularly useful as a coating on metal substrates such as the surface of steel and aluminum pipe. The composition may be applied by spraying, brushing, or dipping, all conventional techniques, and is customarily applied after the metal surface is cleaned. After the primer is applied to the metal surface, the solvent therefor is volatilized, leaving a continuous coating on the surface, typically from about 0.1 to about 3, preferably about 2, mils in thickness.

One or more additional coatings are applied over the primer coating; typically, the first is a bituminous finish coating. Preferably, the finish coating contains about 80 to about 95 percent by weight inert mineral filler, and about 5 to about 20% by weight of solvent extracted, air-blown asphalt. The new finish coating composition of this invention is particularly useful, and is applied to produce a thickness of about 0.5 to about 2.5 inches over the primer coating. Extruding the hot mixture is a conventional method for applying the finish coating. Over the finish coating, some manufacturers apply coatings such as concrete to increase the weight of the surface, particularly where the surface is pipe to be placed in underwater service. Metal substrates such as steel or aluminum pipe having a primer and finish coating of the kinds described hereinabove typically have shear strength of about 700 to about 2,000 lb. as measured by the Shear Test described below.

SHEAR TEST PROCEDURE

A segment of steel pipe, 1⅛-inches high cut from a ¾-inch nominal size, schedule 80 steel pipe is sandblasted, coated with the primer of this invention, allowed to dry, and placed on a flat metallic plate with an integral annular portion protruding therefrom measuring ⅛-inch high and 0.41 inch-wide. The primed pipe is placed on end within this annular protrusion. A steel pipe segment, 1⅛ inches high cut from a 2-inch nominal size, schedule 80 steel pipe is sandblasted and positioned on end outside the primed pipe and outside the annular portion of the base, thus forming an annular, cylindrical space between the two pipes. An annular piece of release paper is placed on the protruding portion of the plate and between the two pipe segments. This assembly is heated to 200° F., and the annular space between the two pipes is packed by hand with bituminous finish coating heated to 400° F. so that a small excess of coating extends above the top of the pipe segments. After packing, the mold is placed in a 400° oven for 10–15 minutes, and 50 lb. compression is applied to the packing to insure that the annular space is completely filled. Excess finish coating is trimmed from the pipe ends, and the molded sample is cooled to room temperature, about 73°–80° F.

After the test specimen has been prepared, the flat plate is removed and the specimen is aged at least 24 hours before testing. This specimen contains both pipe segments with the finish coat and primer between. The specimen is tested on a new support plate similar to the first, but having a 1.5-inch diameter hole cut through the center, so that the bottom of the ¾-inch pipe segment and the finish coating near the ¾-inch pipe are not resting on the plate. The test is conducted with a Marshall Apparatus (ASTM Test D 1559-73) loading jack. Using a punch to fit the top of the ¾-inch pipe, force is applied with the jack traveling upward at a uniform rate, and the maximum pounds of force required to break the specimen at the primer surface or in the coating close to the primer is determined.

EXAMPLES

Using the formulation methods set forth above, primer coating compositions of this invention, and finish coating compositions, including the finish coating composition of this invention, were prepared. Table I shows the properties of the asphalt binders used in two finish coatings that were subjected to the Shear Test. Table II sets forth the properties of two asphalt primers used in that same test. Primer I is an example of the primer of this invention. Table III describes the results obtained in the Shear Test using the primers and finish coating of Tables I and II, and shows clearly that the primer of this invention greatly increases the shear strength of the primer/finish coating applied to steel pipe.

Table IV shows the results of the Shear Test using different thicknesses of the primers of the invention (I, II and III), and of a closely related primer (IV). The results show that a primer thickness of about 2 mils, and a penetration of not more than about 8, combine to produce disbonding strengths greater than 700 lbs. In each of these examples, the finish coating was the asphalt binder A described in Table I, together with inert mineral filler comprising 64.5% by weight sand, 22.7% by weight limestone, 0.162% by weight glass fiber, and 12.6% by weight asphalt. Each finish coating was about 7/16-inch thick.

Table V illustrates the results obtained in the Shear Test where the binder content of the finish coating is varied, and where the kind of binder used in the finish coating composition is varied. The binder asphalt used in compositions U and V of Table V is an example of the new asphalt blend of this invention.

Table I
Properties of Asphalt Binders for Finish Coatings Used In Shear Tests

| Test | Asphalt A(1) | Prior Art Asphalt X(2) |
|---|---|---|
| Softening Point, ° F. | 188 | 192 |
| Penetration at 77° F., mm/10 | 18 | 18 |
| Ductility at 77° F., cm. | 4.5 | 3.4 |
| Viscosity, SFS at 375° F. | 104 | 93 |

(1) Air-blown, solvent extracted asphalt having a penetration of 15-18 and a softening point of 175°-195° F. Before blowing, this asphalt had a penetration of 150-200 and a softening point of 104° F.
(2) Not precisely determinable, but apparently a non-solvent-extracted, air-blown asphalt.

Table II
Properties of Asphalt Primers Used for Shear Tests

| Test | Primer I(1) | Primer Y(2) |
|---|---|---|
| Viscosity, Saybolt Furol, Sec. (SFS) | 71 | 470 |
| API Gravity at 60° F. | 25.3 | 27.3 |
| Lb./gal at 60° F. | 7.51 | 7.42 |
| Flash Point, Tag Open Cup (T.O.C.), ° F. | 106 | 108 |
| Solids Content, percent (%) by wt. | 50.9 | 52.1 |
| Cutback Distillation: Initial Boiling Point (IBP), ° F. | 340 | 330 |
| % over at 374° F. | 29.0 | 32.8 |
| % over at 437° F. | 49.0 | 44.5 |
| % over at 500° F. | 54.0 | 48.5 |
| % over at 600° F. | 57.0 | |
| % over at 680° F. | 58.5 | |
| Tests on Residue from Distillation: | | |
| Softening Point, ° F. | 182 | 180 |
| Penetration | 8 | 22 |

(1) An air-blown, propane extracted asphalt having a penetration of 7, and a softening point of 192° F. Unblown, this asphalt had a penetration of 7-15, and a softening point of 156° F.
(2) Not precisely determinable, but apparently the same asphalt described in fn. (2), Table I.

Table III
Comparison of Inventive Coating And Prior Art Coating

| Primer | Primer Thickness | Binder Asphalt | Coating Thickness | Lbs. to Fail |
|---|---|---|---|---|
| I (1) | 0.0015 inch | A(3) | 7/16-inch | 1021 |
| I (2 coats) | 0.003 inch | A | 7/16-inch | 1316 |
| Y (2) (diluted) | 0.0015 inch | X(4) | 7/16-inch | 580 |
| Y | 0.003 inch | X | 7/16-inch | 426 |

(1), (2) See Table I for description
(3), (4) See Table II for description

Table IV
Comparison of Various Primers and Film Thickness in Shear Test
(Finish Coating Asphalt Binder A Used)

| Primer Coating Thickness, Mils | Lbs. To Fail | |
|---|---|---|
| Primer Formulation | 1 | 2 |
| I(1) | 733 | 885 |
| II(2) | 922 | 1037 |
| III(3) | 605 | 697 |
| IV(4) | 513 | 611 |

(1) See fn.(1), Table II, for description.
(2) An air-blown, propane extracted asphalt having a penetration of 5 and a softening point of 232° F. Unblown, the asphalt had a penetration of 60-70 and a softening point of 120° F.
(3) An air-blown, propane extracted asphalt having a penetration of 11, and a softening point of 212° F. Unblown, the asphalt had a penetration of 150-200 and a softening point of 103° F.
(4) An air-blown, propane extracted asphalt having a penetration of 17, and a softening point of 170° F. Unblown, the asphalt had a penetration of 150-200 and a softening point of 104° F.

Table V
Effect on Shear Strength of Variations in Binder Types and Content of Finish Coatings

| Primer Formulation | Primer Thickness | Finish Coating Composition | Finish Coating Thickness | Lbs. to Failure |
|---|---|---|---|---|
| I(4) | .0015 inch | Q | 7/16 inch | 1050, 1225 (1) |
| I(4) | .0015 inch | R | 7/16 inch | 1405, 1640 (1) |
| I(4) | .0015 inch | S | 7/16 inch | 967 |
| I(4) | .0015 inch | T | 7/16 inch | 816 |
| I(4) | .0015 inch | U | 7/16 inch | 1090 |
| I(4) | .0015 inch | V | 7/16 inch | 1080 |

| Finish Coating Composition | Q | R | S | T | U | V |
|---|---|---|---|---|---|---|
| Finish Coating Components | Percent By Weight → | → | → | → | → | → |
| Asphalt | 12.6(2) | 10.0(2) | 15.0(2) | 8.0(2) | 12.6(3) | 10.0(3) |
| Sand | 64.5 | 66.4 | 62.7 | 67.9 | 64.5 | 66.4 |
| Limestone | 22.7 | 23.4 | 22.1 | 23.9 | 22.7 | 23.4 |
| Glass Fiber | 0.16 | 0.17 | 0.16 | 0.17 | 0.16 | 0.17 |

(1) Results from two separate sets of tests
(2) See fn. (1), Table I, for description
(3) Blend containing 85% by weight of an air-blown, propane extracted asphalt having a softening point of 225° F. and a penetration of 0, and 15% by weight of an unblown, solvent extracted asphalt having a penetration of 75 and a softening point of 118. The blend has a softening point of 200° F., a penetration of about 13, and a ductility of 3.5 cm.
(4) See fn. (1), Table II, for description.

WHAT IS CLAIMED IS:
1. A highly ductile binder comprising a blend of about 70 to about 92 parts by weight of an air-blown, solvent extracted asphalt having a penetration of about 0 to 7, and a softening point of about 200° to about 250° F., and, correspondingly, about 8 to about 30 parts by weight of a non-air-blown, solvent extracted asphalt having a penetration of about 40 to about 150, and a softening point of about 105° to about 130° F., said blend having a penetration of about 7 to about 15, a softening point of about 200° to about 220° F., and a ductility of at least about 2.5 cm.

2. A composition comprising about 80% to about 95%, by weight, of inert mineral filler, and, from about 5% to about 20%, by weight, of an asphalt blend consisting essentially of about 70 to about 92 parts by weight of an air-blown, solvent extracted asphalt having a penetration of about 0 to 7, and a softening point of about 200° to about 250° F., and, correspondingly, about 8 to about 30 parts by weight of a non-air-blown, solvent extracted asphalt having a penetration of about 40 to about 150, and a softening point of about 105° to about 130° F., said blend having a penetration of about 7 to about 15, a softening point of about 200° to about 220° F., and a ductility of at least about 2.5 cm.

3. The composition of claim 2 wherein the inert mineral filler comprises about 50% to about 80% by weight sand, about 12% to about 34% by weight limestone, and about 0.01 to about 3% by weight fiber.

4. The composition of claim 3 wherein the fiber is glass fiber.

* * * * *

UNITED STATES PATENT AND TRADEMARK OFFICE
CERTIFICATE OF CORRECTION

PATENT NO. : 4,116,708

DATED : September 26, 1978

INVENTOR(S) : Gilbert W. Tarver et al

It is certified that error appears in the above-identified patent and that said Letters Patent are hereby corrected as shown below:

Title page, Assignee:, change "Lion Oil Company" to

-- Tosco Corporation --.

Column 1, line 3, change "What is claimed is:" to -- This invention relates --.

Signed and Sealed this

Twenty-ninth Day of May 1979

[SEAL]

Attest:

RUTH C. MASON
*Attesting Officer*

DONALD W. BANNER
*Commissioner of Patents and Trademarks*